E. F. W. ALEXANDERSON.
ALTERNATING CURRENT MOTOR.
APPLICATION FILED OCT. 19, 1911.
1,060,731.
Patented May 6, 1913.
2 SHEETS—SHEET 1.
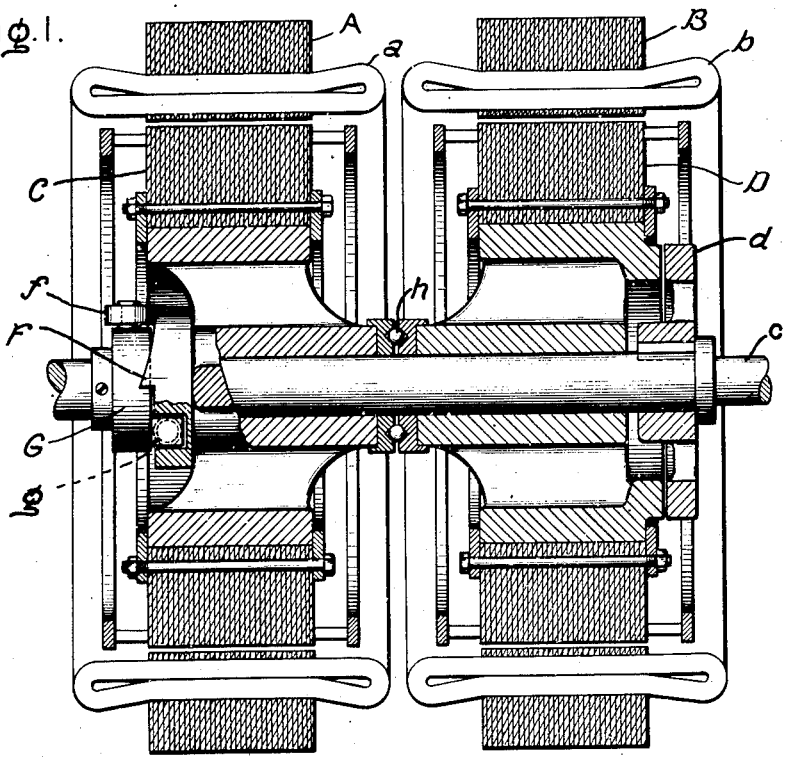
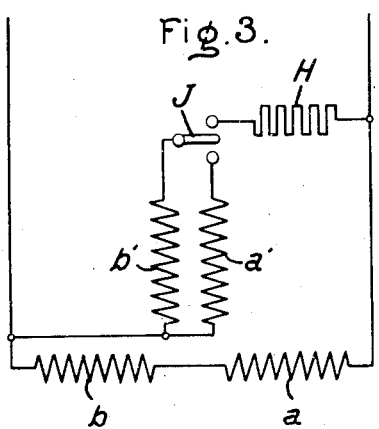
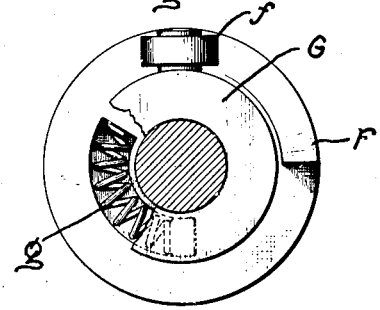
Witnesses
Adolf Grimm
J Ellis Glen
Inventor.
Ernst F. W. Alexanderson
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

1,060,731.  Specification of Letters Patent.  Patented May 6, 1913.

Application filed October 19, 1911. Serial No. 655,479.

*To all whom it may concern:*

Be it known that I, ERNST F. W. ALEXANDERSON, a citizen of the United States, residing at Schenectady, county of Schenectady, State of New York, have invented certain new and useful Improvements in Alternating-Current Motors, of which the following is a specification.

My invention relates to alternating current motors for operation from a single-phase source of supply and particularly to polyphase motors used in conjunction with phase converters for changing the single-phase current from the source to polyphase current for the motor.

The object of my invention is to provide a simple, efficient, and compact combination of motor and converter arranged for permitting the converter to start under no load and when up to speed to assist the motor in driving its load.

My invention comprises a number of features which will be best understood by reference to the accompanying drawings in which—

Figure 4:
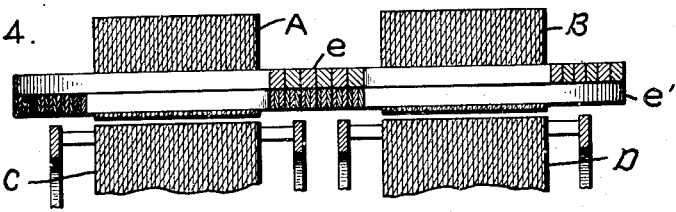
Figure 5:
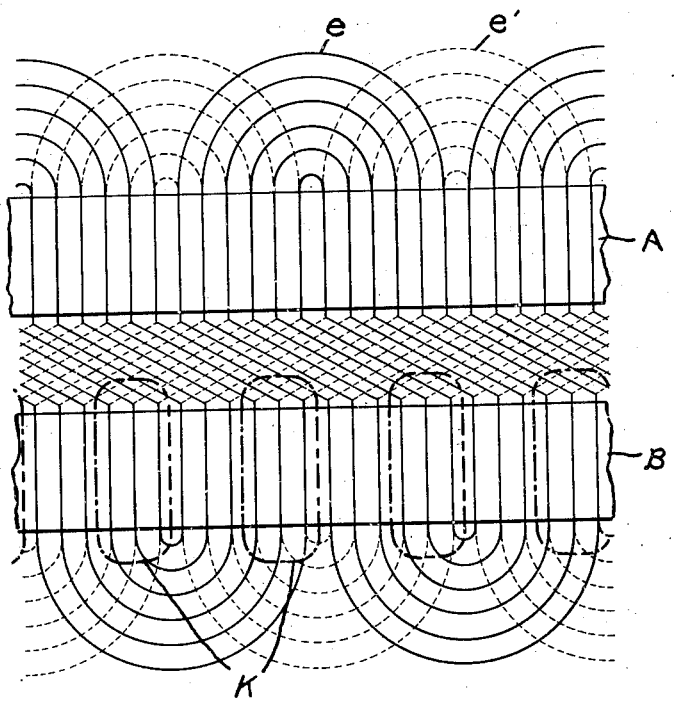
Figure 6:
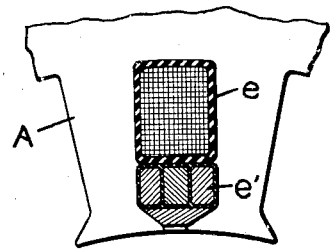

Figure 1 shows somewhat diagrammatically a cross-sectional view of a motor and converter arranged in accordance with my invention; Fig. 2 is a mechanical detail; Fig. 3 is a diagram of winding connections; Fig. 4 shows a modified arrangement of the stator windings; Fig. 5 is a diagrammatic development of the winding arrangement of Fig. 4; and Fig. 6 shows a cross-sectional view of the conductors in one slot of the stator.

In Fig. 1, A and B represent the stators of a motor and phase converter respectively. The stator or primary windings are represented by $a$ and $b$. C and D represent the respective rotors of the motor and converter, both of which are shown as of the squirrel-cage type. The converter rotor D is loosely mounted on the motor shaft $c$ so that it may start freely. This rotor is capable of a limited movement in an axial direction, and when moved to the right, as in Fig. 1, it engages a clutch member $d$, so as to be clutched to the motor shaft and to assist the motor in driving the load. This axial movement of the converter rotor is dependent on the torque of the motor. While the converter is starting light the motor has no torque, but after the converter is up to speed and connected to the motor, as hereafter explained to act as a phase converter therefor, the motor rotor has a torque in a clockwise direction, as viewed from the right hand end of the shaft in Fig. 1. This presses the cam surface F on the motor rotor against a roller $f$ carried on a collar G which is fast to the shaft. The motor rotor thus turns a certain amount on the shaft and at the same time is pressed to the right, as viewed in Fig. 1, by the action of the cam surface and roller. This presses the converter rotor D to the right into engagement with the clutch member $d$, so that the rotor D is connected to the motor shaft through a slipping friction clutch and helps to start the load. The pressure of the converter rotor on the clutch member $d$ is dependent on the motor torque; thus as the motor starts and develops an increasing torque in coming up to speed, the pressure on the clutch member is increased and the slipping reduced, until, when the motor is up to speed, the clutch ceases to slip and the two rotors run at the same speed, dividing the load between them.

A motor designed in this way cannot "break down" like an ordinary induction motor because the very fact that the torque would decrease means that the clutch would be correspondingly released. If the machine were overloaded, so as to slow the motor down and reduce its torque, the pressure on the clutch would be decreased so that the converter armature would come up to full speed and carry whatever torque the motor is able to deliver through the slipping clutch. In this way maximum torque can be carried on the motor all the way to a standstill and the motor will speed up under maximum torque as soon as the load allows it.

In order to prevent the action of the cam surface F from leaving the converter rotor wedged tightly against the clutch surface $d$ when the current is thrown off and the machine is stopped, a compression spring $g$ (best shown in Fig. 2) may be provided between the motor rotor C and the fixed collar G so as to return them to the relative positions shown in Figs. 1 and 2 whenever current is thrown off. The pressure on the clutch surface is thus released so that the converter rotor may start freely the next time current is applied to the machine. In order to permit the free return of the motor rotor by the spring g, anti-friction bearings, as represented by balls h in Fig. 1, may be placed between the two rotors.

A suitable arrangement of connections for starting and for running is shown in Fig. 3. Here the machines are represented as two-phase, the two-phase motor windings being shown at a and a' and the two phases of the converter winding at b and b'. Phases a and b are connected in series to the source of supply. The circuit of phase b' of the converter winding is provided with a switch J through which it may be connected to the source through a non-inductive resistance H for starting, or to phase a' of the motor for running. With the switch J in the starting position, that is, connecting winding b' to resistance H, the converter starts like a split phase motor, the motor winding a serving as reactance in series with phase b of the converter. When the converter is up to speed the switch J is thrown to its other position thereby connecting phase b' of the converter in series with phase a' of the motor. With this latter connection the phase converter serves to change the single-phase current derived from the source to two-phase current for operating the motor. Since the windings of the two machines are thus connected in series for running, a single winding formed of coils common to both stators may be employed in the place of the independent stator windings shown in Fig. 1. Such an arrangement of common coils is shown in Figs. 4, 5 and 6. These coils extend across both stators and comprise in effect two windings; one, e, consisting of coils of a comparatively large number of turns for connection to the source, thus corresponding to windings a and b combined in Fig. 3, and the other, e', which corresponds to windings a' and b' combined in Fig. 3, and which needs have only a few turns as is indicated most clearly in Fig. 6. The coils of both windings extend across both stators but between the stators they are bent in a circumferential direction and the coils e shown in full lines in the diagrammatic development in Fig. 5, are bent in the opposite direction to that in which the coils e', shown in dotted lines, are bent. This has the effect of producing a relatively opposite displacement of the two phases of the two stators. This is necessary if the rotors are to revolve in the same direction and one machine is to act as a generator, that is, a phase converter, and the other as a motor.

Instead of employing the method of starting, shown in Fig. 3, other means may be used, as for instance, shading coils on the stator of the converter. Such coils are indicated by dot and dash lines at K in Fig. 5. These shading coils serve, as it is well understood in the art, to give a small starting torque which enables the converter to start running free and to come up to speed.

I do not desire to limit myself to the particular construction and arrangement of parts shown and described, but aim in the appended claims to cover all modifications which are within the scope of my invention.

What I claim as new and desire to secure by Letters Patent of the United States, is,

1. In combination with a single phase source of supply, a polyphase motor, a phase converter converting single phase current from the source to polyphase current for the motor, and means for mechanically connecting the rotor of the converter to assist the motor in driving the load.

2. In combination with a single phase source of supply, a polyphase motor, a phase converter converting single phase current from the source to polyphase current for the motor, and means controlled by the torque of the motor for mechanically connecting the rotor of the converter to assist the motor in driving the load.

3. In combination with a single phase source of supply, a polyphase motor, a phase converter having its rotor loosely mounted on the motor shaft, and a clutch for connecting said rotor to said shaft.

4. In combination with a single phase source of supply, a polyphase motor, a phase converter having its rotor loosely mounted on the motor shaft and a clutch controlled by the torque of the motor for connecting said rotor to said shaft.

5. In combination with a single phase source of supply, a polyphase motor, a phase converter having its rotor loosely mounted on the motor shaft and capable of axial movement thereon, a clutch actuated by the axial movement of said rotor for connecting said rotor to said shaft, and automatic means controlled by the motor torque for moving said motor axially.

6. In combination with a single phase source of supply, a polyphase motor, a phase converter having polyphase windings, one phase of said windings being connected in series with one phase of said motor, means for alternately establishing starting connections for another phase of said windings and connecting it to another phase of said motor, and means for mechanically connecting the rotor of the converter to assist the motor in driving the load.

7. In combination with a single phase source of supply, a polyphase motor, a phase converter having polyphase windings, one phase of said windings being connected in series with one phase of said motor, means for alternately establishing starting connections for another phase of said windings and connecting it to another phase of said motor, and means controlled by the motor torque for mechanically connecting the rotor of the converter to assist the motor in driving the load.

8. In combination with a single phase source of supply, a polyphase motor, a phase converter having polyphase windings, one phase of said windings being connected in series with one phase of said motor, a non-inductive resistance, and means for connecting another phase of said converter windings alternately to said source through said resistance for starting and to another phase of said motor for running.

In witness whereof, I have hereunto set my hand this 17th day of October, 1911.

ERNST F. W. ALEXANDERSON.

Witnesses:
BENJAMIN B. HULL,
HELEN ORFORD.